(12) United States Patent
Bitar et al.

(10) Patent No.: US 6,353,844 B1
(45) Date of Patent: *Mar. 5, 2002

(54) GUARANTEEING COMPLETION TIMES FOR BATCH JOBS WITHOUT STATIC PARTITIONING

(75) Inventors: Nawaf K. Bitar, San Jose; Robert M. English, Menlo Park, both of CA (US)

(73) Assignee: Silicon Graphics, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,486

(22) Filed: Dec. 23, 1996

(51) Int. Cl.[7] ................................. G06F 9/50
(52) U.S. Cl. ..................................... 709/102
(58) Field of Search ............... 395/671, 672, 395/673; 709/102, 103

(56) References Cited

U.S. PATENT DOCUMENTS

| | | | | |
|---|---|---|---|---|
| 3,648,253 A | * | 3/1972 | Mullery et al. | 340/172.5 |
| 5,291,599 A | * | 3/1994 | Cohen et al. | 395/700 |
| 5,437,032 A | * | 7/1995 | Wolf et al. | 395/650 |
| 5,528,513 A | * | 6/1996 | Vaitzblit et al. | 364/514 A |

OTHER PUBLICATIONS

John A. Stankovic. "The Spring Kernel: A New Paradigm for Real–time Systems", May 1991.*
R. T. Dimpsey. "Performance Prediction and Tuning on a Multiprocessor", 1991.*
Sandeep Khanna. "Realtime Scheduling in SunOS 5.0", 1992.*
Rohit Chandra. "Scheduling and page Migration for Multiprocessor Compute Servers", 1994.*

* cited by examiner

*Primary Examiner*—Majid A. Banankhah
*Assistant Examiner*—Lewis A. Bullock, Jr.
(74) *Attorney, Agent, or Firm*—Schwegman, Lundberg, Woessner & Kluth, P.A.

(57) ABSTRACT

A batch job scheduler facility schedules batch jobs in a general purpose multiprocessor system having resources, such as processors and memory, and running interactive and batch jobs. The resources are allocated to the batch jobs. Completion times are calculated and guaranteed for the batch jobs based on the resources allocated to the batch jobs. The completion times are calculated and guaranteed without static partitioning, resulting in improved utilization of system resources. Batch-critical batch jobs are defined which require all their allocated resources to complete by their guaranteed completion time. The batch jobs are scheduled so that batch jobs and interactive jobs compete for the same resources. Batch-critical jobs are permitted to obtain all their allocated resources.

33 Claims, 6 Drawing Sheets

_US 6,353,844 B1_

GUARANTEEING COMPLETION TIMES FOR BATCH JOBS WITHOUT STATIC PARTITIONING

THE FIELD OF THE INVENTION

The present invention relates generally to computer systems, and in particular to batch job scheduling facilities employed in general purpose multiprocessor computer systems.

BACKGROUND OF THE INVENTION

Multiprocessor computer systems typically run different types of workloads to be executed on the processors such as interactive jobs and batch jobs. Interactive jobs include time-share and real-time jobs and other interactive loads, such as compiling loads and debugging loads. Batch jobs include larger loads such as number-crunching workloads and other workloads requiring large computations. The batch loads typically run for hours and require vast amounts of resources. Typically, a general purpose multiprocessor system handles both interactive and batch jobs in one system, and interactive jobs have tight response time requirements and cannot wait for batch jobs to complete.

In one type of previous general purpose multiprocessor system, static partitioning dedicates a certain number of processors to batch jobs and the rest of the processors to interactive jobs. For example, an eight processor system could have four processors dedicated to interactive jobs and four processors dedicated to batch jobs. In this example, processors run only their type of jobs, regardless of the number of each type of job running in the system. If, for example, no batch jobs are running in the system, the four processors dedicated to batch jobs are idle. Thus, a general purpose multiprocessor system employing static partitioning can have one portion of the machine being heavily overloaded at the same time that the other portion of the machine is idle. With static partitioning, the barrier between batch and interactive jobs is hard and static.

In addition, the static partitioning used in this type of previous general purpose multiprocessor system does not partition memory in the same fashion as processors. Even though a number of processors are dedicated to batch jobs, batch jobs may not make sufficient progress because interactive jobs are using the memory of the system needed by the batch jobs. Alternatively, the interactive response of this type of general purpose multiprocessor system could be slow, even with dedicated interactive processors, as a result of batch jobs using memory in the system.

Because of memory contention, various previous general purpose multiprocessor computer systems employ various types of load-sharing facilities. In this type of system, the load-sharing facility gets allocated some resources, such as processors and/or memory, and the load-sharing facility manages these resources. Jobs are submitted to the load-sharing facility manager and the manager attempts to schedule the batch jobs on the resources allocated to the facility. This type of load-sharing facility solves the resource contention problems, but still results in a significant problem due to static partitioning which results in wasted resources because the resources are dedicated to the load-sharing facility and cannot be used by interactive jobs. In other words, these type of systems allocate more resources than just processors, such as memory, which achieves guaranteed execution times for submitted batch jobs. Nevertheless, if no batch jobs are running in the batch portion of the system, interactive jobs still cannot access the batch portion of the system. Similarly, if no interactive jobs are running in the interactive portion of the system, batch jobs still cannot access the interactive portion of the system.

Therefore, for the reasons stated above, and for other reasons presented in greater detail in the Detailed Description of the Preferred Embodiment section of the present specification, there is a need for an improved batch scheduling facility in a general purpose computer system for scheduling batch jobs with guaranteed completion times in a more efficient manner than currently available with static partitioning of the system. Current load-sharing and batch-queuing user-level service facilities employed in general purpose multiprocessor systems cannot guarantee completion times without statically partitioning the system.

SUMMARY OF THE INVENTION

The present invention provides a method and a general purpose multiprocessor system having a batch scheduling facility for scheduling multiple batch jobs. The general purpose multiprocessor system includes resources and runs interactive and batch jobs. The resources are allocated to each batch job. Completion times are calculated and guaranteed for each batch job based on the resources allocated to each batch job. Batch-critical batch jobs are defined to be those batch jobs which require all their allocated resources to complete by their guaranteed completion time. The batch jobs are scheduled so that batch jobs and interactive jobs compete for the same resources. Batch-critical jobs are permitted to obtain all their allocated resources.

The resources of the multiprocessor system typically include processors and/or memory, and can include other resources.

In one embodiment of the present invention an urgency value is calculated for each batch job substantially equal to the execution time to complete the batch job divided by the time remaining to complete the batch job by the guaranteed completion time minus the maximum processors and/or memory allocated to the job. In this embodiment, a batch-job is defined as batch critical when the calculated urgency value is equal to or greater than zero.

In one embodiment of the present invention, the resources of the multiprocessor system are partitioned into at least one soft system partition. The at least one soft system partition represents a user-level batch queue and is assigned resources. The soft system partition includes soft partition units representing available and unavailable resources over time intervals. The resources are allocated based on the available resources over time intervals.

The soft system partition has many possible implementations. For example, in one embodiment, certain of the multiple batch jobs are allocated multiple segments of the available resources over time intervals. In one embodiment, the multiprocessor system includes multiple soft system partitions. In one embodiment, the at least one soft system partition includes at least one time-varying soft system partition. The time-varying soft system partition is allocated different numbers of processors based on defined time periods.

In one embodiment of the present invention the interactive jobs include normal time-share jobs, weightless time-share jobs, and real-time jobs. The batch-critical jobs are scheduled ahead of the normal time-share jobs and behind the real-time jobs. The batch jobs not defined as batch critical are scheduled behind the normal time-share jobs and ahead of the weightless time-share jobs.

The batch scheduling facility according to the present invention guarantees completion times of batch jobs without using static partitioning like conventional batch scheduling facilities described in the Background of the Invention section. If resources are needed for a batch job to complete on time, the resources are given to the batch job. If the resources are not needed for the batch job to complete on time, the resources are available for use by time-share jobs. If resources are not needed for time share jobs, the resources can be used by batch jobs. Therefore, a general purpose multiprocessor system according to the present invention typically improves response time for time-share jobs and other interactive jobs and also completes the batch jobs faster, because of the more efficient use of the system resources.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Overview of General Purpose Multiprocessor Computer System

Figure 1:
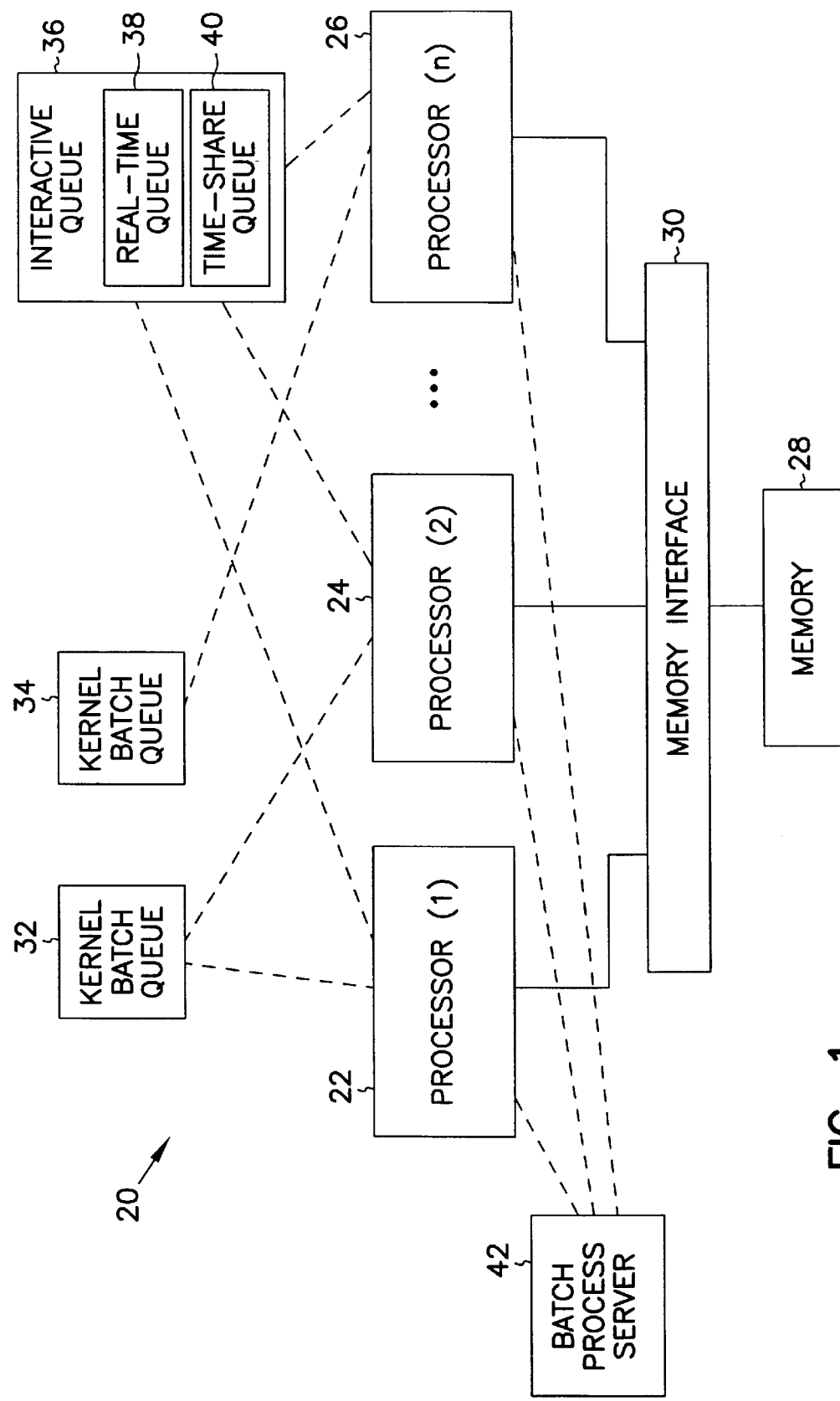
FIG. 1 is a block diagram of a general purpose multiprocessor computer system employing a batch scheduling facility according to the present invention.

A general purpose multiprocessor computer system employing a batch scheduling facility according to the present invention is illustrated generally at 20 in FIG. 1. Multiprocessor system 20 includes N processors or central processing units (CPUs), such as processor (1) indicated at 22, processor (2) indicated at 24, and processor (n) indicated at 26. The N processors communicate with a memory 28 via a memory interface 30. A job is a collection of resources and associated execution streams that may otherwise be unrelated. Multiprocessor system 20 is a general purpose multiprocessor system which runs both batch jobs and interactive jobs. The interactive jobs typically include real-time jobs and time-share jobs.

Multiprocessor system 20 includes one or more kernel batch queues, such as indicated at 32 and 34, for holding jobs scheduled for completion at a future time. Each kernel batch queue is accessible by a certain number of the N processors. For example, if there is a single kernel batch queue 32, the kernel batch queue 32 is accessible by all N processors. In a multiple kernel batch queue system including batch queues 32 and 34, kernel batch queue 32 is accessible to a certain number of the processors and kernel batch queue 34 is accessible by the other processors in the system. The kernel batch queue(s) include(s) jobs scheduled for completion at a future time. Instead of scheduling batch jobs according to a priority scheme such as used for interactive time-share jobs, batch jobs are assigned completion times and the job structures for batch jobs include enough information to complete the jobs by the designated time.

In addition to the kernel batch queues, multiprocessor system 20 includes one or more interactive queues, such as indicated at 36, which optionally includes a real-time queue 38 and a time-share queue 40. Interactive queue 36 stores interactive jobs and is preferably accessible by all processors of general purpose multiprocessor system 20.

A batch process server 42 is a user-level scheduler employed to assign completion times to batch jobs. Batch process server 42 must ensure that the schedules of kernel batch jobs do not conflict. The kernel of each of the N processors makes its best effort to meet completion schedules for batch jobs. Batch jobs compete for any processor time not required to meet a schedule at a lower priority than any time-sharing or real-time job. Fairness and relative job priorities of batch jobs are addressed by the user-level batch scheduler, not the kernel. Typically, multiprocessor system 20 treats real-time jobs with the highest priority, then batch-critical jobs (defined in detail below), then time-share jobs, then batch jobs that are not deemed batch-critical jobs as defined below, and finally the lowest priority jobs are weightless time-share jobs.

Time Allocation for Batch Processes

Batch process server 42 schedules batch jobs or processes so that the kernel has information concerning the scheduling behavior of the batch process. In particular, the kernel has the information to ascertain the time that the batch process is allowed to use, the time by which a process will complete, and the number of processors that the batch process can utilize to finish its task.

Jobs in the kernel batch queue(s) are ordered in terms of urgency. A process's urgency is the difference between the multiprocessing level necessary to complete a job by a deadline time, and the multiprocessing level supported by the process and is represented by the following Equation I. Equation I $$U = (\text{TimeExec}/\text{TimeRemaining}) - \text{MaxCpu} \tag{I}$$

where:
 U=A process's urgency;
 TimeExec=Execution time to complete process;
 TimeRemaining=Time remaining to complete running of process by deadline; and
 MaxCpu=Maximum processors allocated/usable by process.

TimeExec/TimeRemaining processors are allocated to processes in the kernel batch queue until the multiprocessor system's batch load is satisfied. Typically, batch jobs with negative urgency values are allocated to idle processors in the system with a lower priority than weighted time-share jobs and Just ahead of time-share jobs which do not carry a weight. Typically batch jobs with a zero or positive urgency value are allocated to idle processors ahead of weighted time-share jobs and behind real-time jobs.

If a job in the kernel batch queue exhausts its time allocation, that job is removed from the kernel batch queue and a batch-expel action is taken. The batch-expel action typically includes killing the process, stopping the process, or converting the process to a weightless time-share process. The choice of which batch-expel action to take is under user control and typically defaults to converting the process to a weightless time-share process. Stopped or weightless time-share processes can be examined and resubmitted to the kernel batch queue for more processing.

The above batch algorithm schedules processes strictly based on the relative urgencies. Since fairness is guaranteed by the completion schedule, other factors can enter into the scheduling decision for processes whose urgency is less than zero. In particular, it is possible to choose between processes with similar levels of urgency based on memory considerations, rather than time considerations.

If the memory requirements of a process have not been met, the process may require additional processor time to complete its task, invalidating a schedule. Thus, memory 28 is also preferably allocated, such that processes are allowed to run without being charged for system time when its memory allotment is incomplete. In other embodiments, each batch job has an allocated amount of processors and memory. For example, job(0) is allocated 16 processors and 8 megabytes of memory and job(1) is allocated two processors and 4 megabytes of memory. Other resources other than memory and processors can also be allocated.

In the above model, where only processors are considered and the assumption is made that all jobs have adequate memory, the batch algorithm can basically be expressed to state that if a job needs X processors and has N seconds of processor time required to run, then, within N/X of completion time (i.e., the batch job's urgency is equal to or greater than zero), that batch job becomes critical and must run, in which case it preempts other jobs and grabs the resources it needs. Prior to that time, the batch jobs run opportunistically to fill any empty gaps available to it.

In other words, the above Equation I provides an urgency (U) calculation wherein when the urgency becomes zero or positive, the batch job becomes a critical batch job. The following Table I provides an example of a kernel batch queue with five non-critical batch jobs in a four processor system.

TABLE I

| Batch Job | TimeRemaining (Deadline) | Max CPU (Space-Width) | TimeExec (Time-Length) | Urgency (U) | Assigned Processors |
|---|---|---|---|---|---|
| 4 | 150 | 1 | 50 | −0.67 | 1 |
| 1 | 450 | 4 | 600 | −2.67 | 1 |
| 3 | 100 | 3 | 75 | −2.25 | 1 |
| 2 | 75 | 4 | 100 | −2.67 | 1 |
| 5 | 38 | 4 | 50 | −2.685 | 0 |

The above Table I shows five batch jobs numbered 1–5. As indicated in Table I, batch job 4 has the highest urgency as calculated according to Equation I. As none of the batch jobs have an urgency equal to or greater than zero, batch jobs 4, 1, 3, and 2 are the highest urgency jobs and are each assigned one processor for execution. The lowest urgency batch job 5 is not assigned to a processor.

Batch Scheduling Facility

Figure 2:
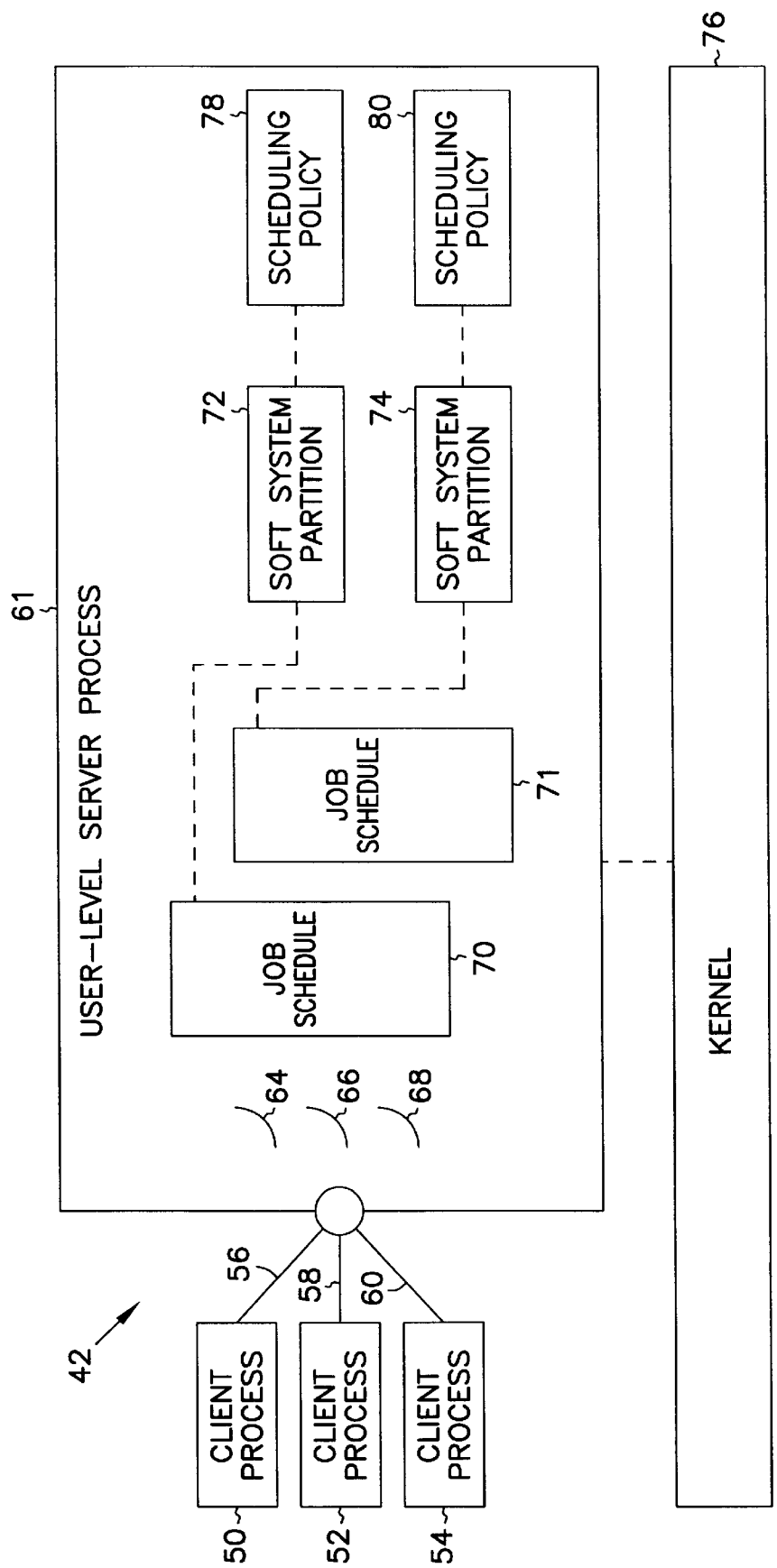
FIG. 2 is a diagram illustrating the operation of a batch process server employed by the general purpose multiprocessor computer system of FIG. 1.

The operation of batch process server 42 is illustrated in FIG. 2. As illustrated, three client processes 50, 52, and 54 make requests 56, 58, and 60 to a user-level server process 61. User-level server process 61 receives the client requests 56, 58, and 60. User-level server process 61 includes one or more server threads, such as indicated at 64, 66, and 68, that wait for incoming client requests. Examples of client requests 56, 58, and 60 are to submit a job, cancel a job, query about the status of server process 61, or change the system parameters of server process 61. When a request comes in to user-level server process 61, the server thread that accepts the request, processes the request. After a request is processed at the user level, the scheduling information is passed to the kernel, such as indicated at 76.

User-level server process 61 generates a non-conflicting schedule of batch jobs represented by one or more job schedules, such as indicated by job schedules 70 and 71 based on the constraints of the multiprocessor system as represented by one or more associated soft system partitions, such as indicated by soft system partition 72 associated with job schedule 70 and soft system partition 74 associated with job schedule 71. The job schedules 70 and 71 guarantee to the user a time of completion for a particular batch job. A scheduling policy 78 is associated with soft system partition 72 and a scheduling policy 80 is associated with soft system partition 74.

The client side of user-level server process 61 includes a set of functional calls, and programs built on top of the functional calls that communicate user requests to the user-level server process 61. The functional call interface is optionally used directly by programs that require or desire tight control of the job's batch execution. The functional call interface, however, is not expected to be the normal way programs are put on the kernel batch queue. Example functions and the function's respective programs are as follows: bps_submit and submit; bps_cancel and cancel; bps_resubmit and resubmit; and bps_query and query. The client interface communicates to user-level server process 61 by performing a remote procedure call and blocks until the server process returns a reply. These client function calls and the functions' respective programs are described in detail below.

The user-level service process 61 or server is a single multi-threaded or single-threaded, object-oriented, trusted, user-level process that generates a non-conflicting schedule. The user-level service process 61 is restartable after a system crash. Almost all server variables are typically changeable during system operation without requiring a restart. The user-level service process's task is to generate the non-conflicting schedule given the hardware constraints and scheduling policy associated with each soft system partition. The request the user-level process receives includes a CPU or processor width, a time length, and memory usage, and optionally includes a completion time.

The bookkeeping of the space/time managed by the batch process server is handled by the user-level scheduling policies, such as indicated at 78 and 80 and the associated soft system partitions, such as indicated at 72 and 74. In one embodiment of the present invention, the scheduling policies are first fit policies.

The soft system partitions represent user-level batch queues and are assigned resources, such as CPUs and/or memory. The clients submit jobs to their associated soft system partition. For example, client process 50 and 52 could be marked in their submit operation to be associated to soft system partition 72 and client process 54 could be marked in its submit operation to be associated to soft system partition 74.

Figure 3:
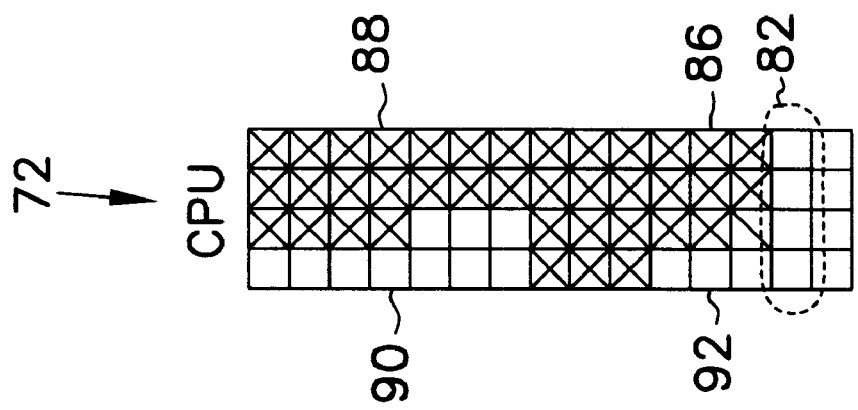
FIG. 3 is a diagram illustrating an example soft system partition having allocated processor resources for the batch process server of FIG. 2.

In the soft system partition space represents the amount of memory and/or number of CPUs physically available at one instant in time. An example soft system partition 72 having allocated processor resources is illustrated in FIG. 3. Soft system partition 72 includes soft system partition units, such as indicated at 82. Allocated processor space is indicated at 86 and 88. Unallocated processor space is indicated at 90 and 92. The length of the rectangle of the soft system partition represents the time into the future an allocation can end. The soft system partition is partitioned into blocks of space/time, referred to as soft system partition units, such as indicated at 82, whose length in time is identical, but whose space can vary with time. The global pool, from which partitions are allocated from, is managed by a partition manager. The job allocations, on the other hand, are managed by the soft system partition.

Figure 4:
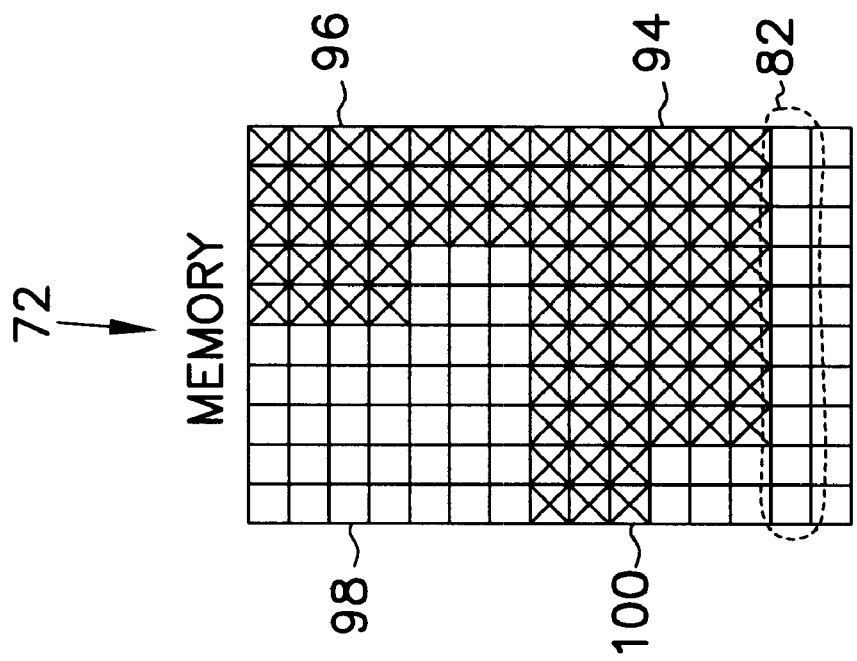
FIG. 4 is a diagram illustrating an example soft system partition having allocated memory resources for the batch process server of FIG. 2.

An example soft system partition 72 having allocated memory resources is illustrated in FIG. 4. Soft system partition 72 includes soft system partition units, such as indicated at 82. Allocated memory space is indicated at 94 and 96. Unallocated memory space is indicated at 98 and 100.

As illustrated in FIGS. 3 and 4, a soft system partition, such as indicated at 72, internally includes an array of soft system partition units indicated at 82. A soft system partition unit represents available space over a time interval. The size of the interval determines the smallest job that can be allocated from a soft system partition. When an allocation is made, CPUs and/or memory resources are reserved in a soft system partition unit. The completion time for a batch job is generated based on the resources dedicated to its soft system partition; the batch job's execution, however, is not limited to the utilization of the resources of its soft system partition. Furthermore, a batch job cannot be longer than a soft system partition's total length, and cannot be shorter than a soft system partition units's time interval.

The user-level server process 61 has a notion of a default soft system partition, which is used if no soft system partition is specified by the user. A soft system partition optionally has its access controlled through an authenticator. The soft system partition is useful as a mechanism for splitting a system up into logical divisions for different groups of users. For example, as illustrated in FIG. 2, one department/division of a corporation or university may be assigned soft system partition 72 and another department/division assigned soft system partition 74.

A job schedule, such as indicated at 70 and 71, is a linked list of allocated batch jobs maintained in user space. An example batch job has a start time, a duration, a magic cookie, and a soft system universal user identification (UUID). The magic cookie is the process group ID of the batch job and can be used by the kernel to refer to the batch control block. The batch job stays in the schedule until the kernel informs the server that the batch job time allocation has been used up or by an explicit cancel request from the user. It is possible for a batch job to be deleted even if the batch control block still exists.

A scheduling policy, such as indicated at 78 and 80 in FIG. 2, is a mechanism by which a completion time is generated for a batch job submitted to the associated soft system partition based on the resources requested by the batch job and the availability of resources in the associated soft system partition. Example policies include first fit and highest priority first policies.

In one embodiment of the invention, a policy manager has a linked list of scheduling policies. When a request for a policy is made, the policy manager attempts to match the requested policy ID with a policy. The policy ID is a UUID. The default policy starts its search for an allocation of space at a point in time equal to the current time plus the size of the job. When not considering memory, the task of the policy is to find a rectangle of 'n' CPUs over time 't' (n/t), where n is a permissible number of CPUs to run the job and t is the amount of time needed to run the job. The policy attempts to find the rectangle with the earliest completion time that meets those requirements. n is the integer multiple of CPUs specified by the user, or 1 by default. The user can optionally specify a completion time for a job to execute by, and if no rectangular contiguous allocation can be made within the given completion time, an error is returned to the user.

Figure 5:
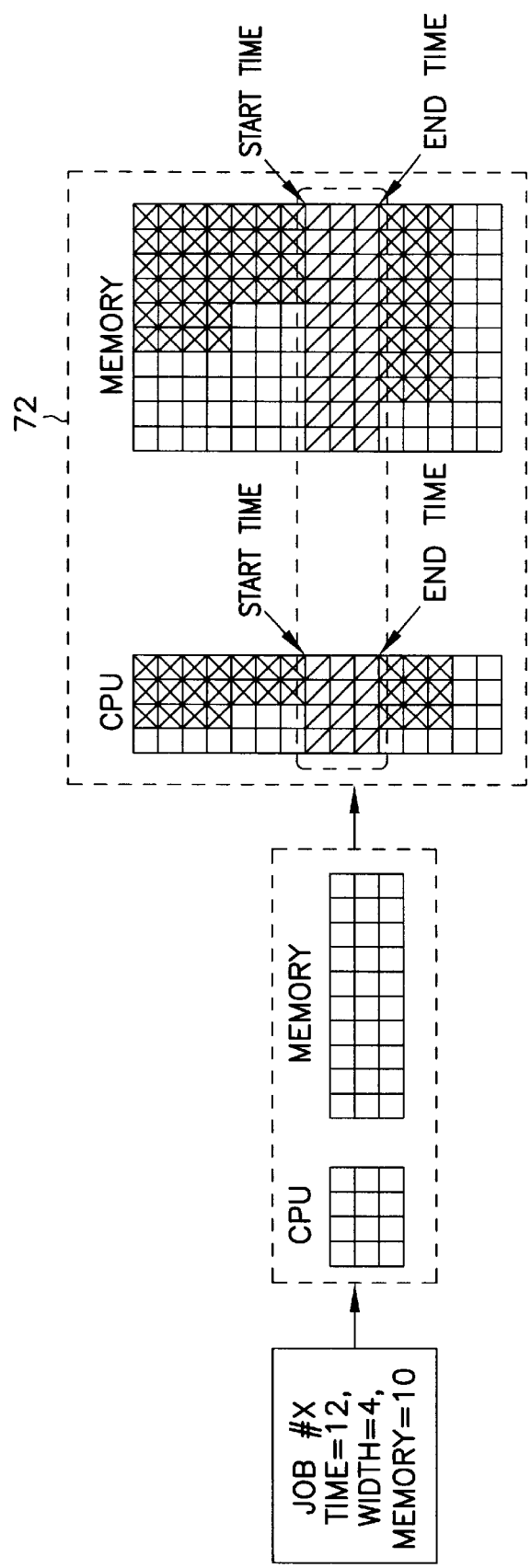
FIG. 5 is a diagram illustrating an example of a job allocation performed by the batch process server of FIG. 2.

An example job allocation is illustrated in FIG. 5. A job(X) has a time equal to 12, a width equal to 4 CPUs, and a memory usage of 10 megabytes of memory which equates to a space/time interval having a space width of 4, space memory usage of 10 and a time length of 3. As illustrated in FIG. 5, job(X) has a start time indicated at the top of its allocated space/time interval and an end time indicated at the bottom of its allocated space/time interval.

Figure 6:
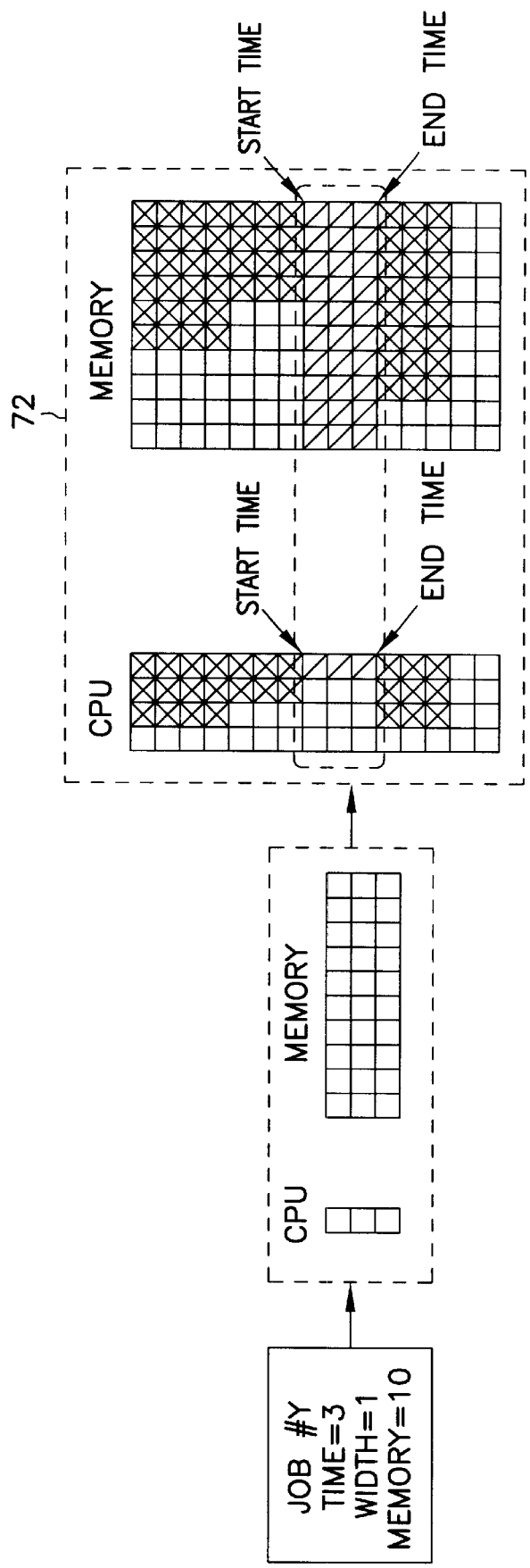
FIG. 6 is a diagram illustrating an example of a job allocation performed by the batch process server of FIG. 2.

Another example job allocation is illustrated in FIG. 6. A job(Y) has a time equal to 3, a width equal to 1 CPU, and a memory usage of 10 megabytes of memory which equates to a space/time interval having a space width of 1, space memory usage of 10, and a time length of 3. As illustrated in FIG. 6, job(Y) has a start time indicated at the top of its allocated space/time interval and an end time indicated at the bottom of its allocated space/time interval. Note that the remaining 3 CPUs in the time interval that job(Y) is scheduled cannot be used to generate a completion time for any other job that requires memory, as job(Y) has reserved all of the memory allocated to the soft system partition for that time interval.

Figure 7:
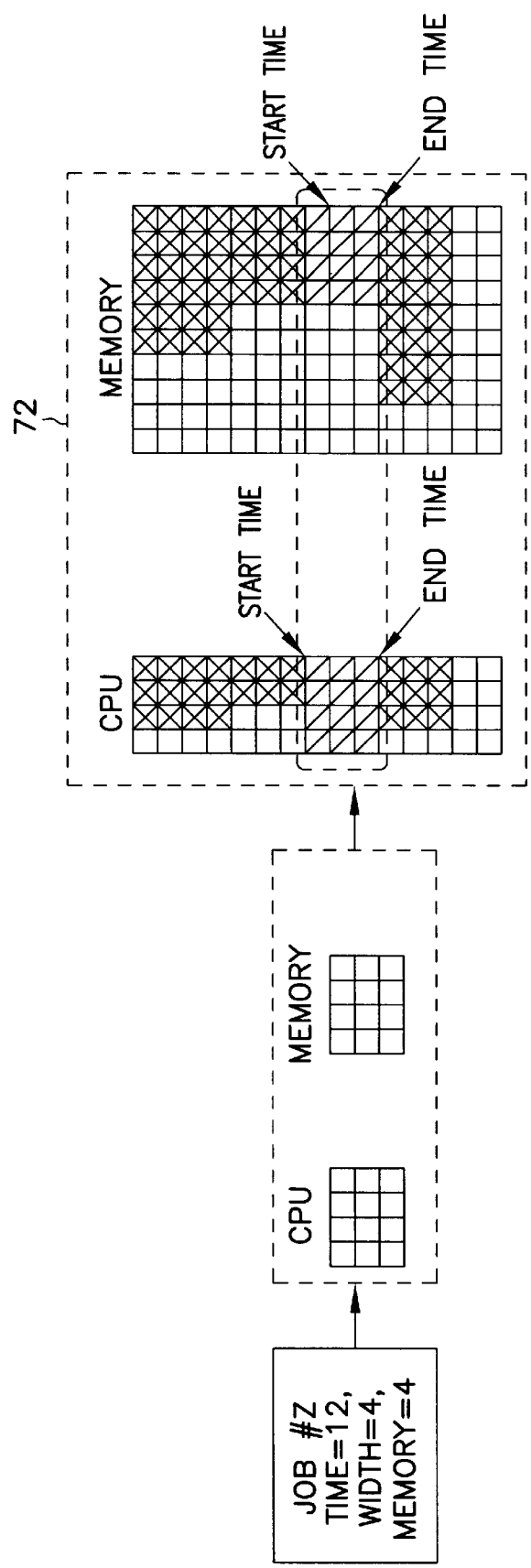
FIG. 7 is a diagram illustrating an example of a job allocation performed by the batch process server of FIG. 2.

Another example job allocation is illustrated in FIG. 7. A job(Z) has a time equal to 12, a width equal to 4 CPU, and a memory usage of 4 megabytes of memory which equates to a space/time interval having a space width of 4, space memory usage of 4, and a time length of 3. As illustrated in FIG. 7, job(Z) has a start time indicated at the top of its allocated space/time interval and an end time indicated at the bottom of its allocated space/time interval. Note that the remaining 6 megabytes of memory in the time interval that job(Z) is scheduled cannot be used to generate a completion time for any other job, as job(Z) has reserved all of the CPUs allocated to the soft system partition for that time interval.

Even though the batch-process server allocates a segment of CPU and memory space, the kernel schedule may "fold" the job by allocating fewer processors than the full-width over longer and possibly discontinuous periods of time. At the time of submission, a batch job can specify a desire to execute statically, which results in the batch job being run full-width as late as possible to meet the deadline. While this eliminates potentially early completion of a job due to varying load factors, it guarantees full-width with no processor movement. Relative to the default policy, a static job is a job where 'n' is the number of CPUs requested.

A server thread, such as indicated at 64, 66, and 68 in FIG. 2, is a main loop of the user-level server process 61. The server thread begins execution right after the soft system partitions 72 and 74, and the job schedules 70 and 71 have been correctly initialized. Each server thread waits for a request to come in, and when the request comes in, the server thread services the request.

The kernel, such as indicated at 76 in FIG. 2, creates a batch control block for each new batch process. The batch control block is used by the batch process server 42 to set the parameters of a batch job. The batch control block includes a time of completion, how much memory is allocated, and the space width of the job. The batch control block is employed by the kernel to schedule jobs. A batch control block is created as part of the below-described 'submit' operation. The batch control block is inherited by a child process, and is deleted only when all processes referring to the batch control block terminate. A child process of a batch job that sets itself as batch gets a new batch control block. The batch control block information is exported to user space.

Batch/Time Sharing/Real-Time Arbitration

Typically, the kernel batch scheduler runs infrequently and generates a list of batch jobs that need to be run in order to meet their deadlines. As discussed above, these batch jobs with a high urgency (i.e., urgency equal to or greater than zero), are referred to as batch-critical jobs. Processors are assigned from the global pool based on their affinity to these processes, if such affinity exists. Positively weighted time-share jobs compete with one another for the remaining processors. If a processor becomes idle, the processor first searches for work from the time-share queues on other processors, then from the batch queues, and finally from the zero-weighted background queue.

Typically, real-time processes are kept in a single global queue unless they are attached to a single CPU. When a real-time process becomes runnable, the real-time process chooses a processor based on what is running on the processor in inverse order of scheduling priority (i.e, first idle processors, then zero-weighted time-share processes, then batch processes which are not batch critical, then normal time-share processes, then batch-critical processes, then lower-priority real time processes). Since in a large multiprocessor system, this search could become long causing significant latency, CPUs maintain data structures to aid in the search and the system typically favors real-time latency over accurate preemption choices.

Optional Features of Batch Scheduler Facility

One feature of the batch scheduler facility of the present invention is that the facility permits multiple soft system partitions to be used, such that each soft system partition is only allocated a portion of the CPUs of the entire multiprocessor system. For example, in a two soft system partition system having a total of six CPUs, four CPUs could be allocated to the first of the soft system partitions and the remaining two CPUs could be allocated to the second of the soft system partitions.

In addition, time-varying soft system partitions can be utilized so that the soft system partitions vary during for example, between day and night jobs. For example, in a 32 processor system one time-varying soft system partition could be allocated 20 CPUs during defined night time hours and allocated only 4 CPUs during defined day time hours to permit faster interactive response and more interactive jobs to be run during the defined day time hours or possibly permit other batch soft system partitions to be allocated more resources in the day time hours.

Another feature which can be utilized with the batch scheduler facility of the present invention is that a given batch job can have multiple segments in the soft system partition. For example, a user could requests 5 CPUs for two hours and 1 CPU for one hour. A batch job having such multiple segments has a more complicated execution path. Nevertheless, it is much easier to schedule the batch job with smaller space/time segments than a batch job requesting one larger chunk of space/time because a soft system partition, such as illustrated in FIGS. 3, 4, and 5, typically includes many more of the relatively smaller empty chunks of space/time as compared to the relatively larger empty chunks of space/time.

Client Side Function Calls and Their Respective Programs

The following are detailed descriptions of example client function calls and the functions' respective programs and the required and optional parameters of the function call. There are, however, many other possible suitable client side to user-level server process interfaces.

Submit submit -n -m -t[-w -s -c -S]-f<job><args>

-n minimum number of CPUs
-m minimum memory requirements
-w time by which the job must complete
-c what is the multiple of CPUs that are acceptable
-s which soft system partition should be used
-STATIC the job runs statically 'submit' returns a magic cookie and a time of completion if the job is accepted, otherwise it returns a −1 and prints an appropriate error message. The magic cookie could, for example, be the UNIX process group ID.

The 'submit' command at the user client level forks off a different process that calls 'bps_submit'. The parent process meanwhile in a busy wait queries the '/proc' entry of the child process. If the process is successfully scheduled as batch, the child process entry has a non-zero batch control block (BCB) id. If the scheduler cannot schedule the BCB, a signal is generated and the parent process prints an appropriate error message; the job, however, is scheduled as a normal process.

Inside of 'bps_submit', the group id of the process is set to the current process id and the BCB is created. The kernel then contacts the server process with the parameters and the magic cookie set to the process id. The user level server, after receiving a submit request, verifies that the partition exists; gets the appropriate policy object; gets the job from the policy object; and submits the time of completion, the duration, and the space requirements to the kernel. The kernel uses the magic cookie supplied by the server to identify the correct BCB and set its parameters.

At the kernel client level when the reply is received by the server and the process is accepted, the kernel execs the job with the arguments passed in.

Resubmit resubmit -n -m -t[-w -s -c]-e

-n minimum number of CPUs
-m minimum memory requirements
-w time by which the job must complete
-c what is the multiple of CPUs that are acceptable
-s which soft system partition should be used
-e the id of the job returned by submit 'resubmit' returns 0 if it succeeds, −1 if it fails, and provides an appropriate error message. If it succeeds, it provides the new time of completion of the job.

The 'resubmit' command works like the 'submit' command. The only differences are that at the client kernel level no new BCB is created and no job is exec'ed.

Cancel cancel -c

-c id returned by submit

'cancel' returns 0 if it succeeds, a −1 if it fails and provides an appropriate error message.

A 'cancel' only works on a job that has a BCB. At the user client level it calls 'cancel' which then traps into the kernel. At the kernel level it verifies that the BCB in question exists and that the user has the permissions necessary to cancel the BCB. If the user can cancel the BCB, the server is then contacted.

At the user server level, the server checks to see if it still has an allocation in its job schedule for the job referred to by the magic cookie. If the job exists, the job is deleted as well as any resources from any soft system partition. The user process then returns to the kernel. If the job does not exist, no action is taken.

At the kernel level, when the response is received, the job is deleted by killing the entire group associated with the BCB that, as a side effect, also deletes the BCB.

Query query -s -e[-p]

-s start of time interval

-e end of time interval

-p the soft system partition. If no partition is specified then the system information is returned.

'query' returns a snapshot of the usage of CPUs and memory for either the entire system or a particular partition. The data it returns is either a table for a particular soft system partition which has the number of free CPUs and amount of free memory per time interval, or a table of soft system partition id's and the percentage of free CPUs and free memory over the time interval.

Conclusion

The batch scheduling facility according to the present invention guarantees completion times of batch jobs without using static partitioning like conventional batch scheduling mechanisms. In the batch scheduling facility of the present invention, resources such as CPUs and memory can be allocated across a boundary which is soft (i.e., not hard). If needed, a batch job becomes critical and takes the necessary resources the batch job is allocated to guarantee completion of the batch job by a deadline. Since there are only soft allocations and not static partitioning, interactive jobs can borrow resources, such as CPUs and memory, from batch jobs and batch jobs can borrow such resources from interactive jobs. If a batch job becomes critical, the batch job forcefully reclaims the guaranteed resources of the soft system partition, if these resources were borrowed by an interactive job. In this way, a general purpose multiprocessor system employing the batch scheduling of the present invention typically improves the response time of time-share jobs and other interactive jobs and also completes the batch jobs faster, because of the more efficient use to the resources.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of scheduling multiple batch jobs in a general purpose multiprocessor system having resources and running interactive jobs and batch jobs, the method comprising:

allocating resources to each batch job;

calculating and guaranteeing completion times for each batch job based on the resources allocated to each batch job;

defining, as batch-critical batch jobs, those batch jobs which require assignment of all their allocated resources in order to complete by their guaranteed completion time; and scheduling the batch jobs such that batch jobs and interactive jobs compete for the same resources, and such that the resources are dynamically distributed at intervals among the batch and interactive jobs as a function of job urgency, wherein scheduling includes allowing the batch-critical jobs to obtain all their allocated resources.

2. The method of claim 1 wherein allocating includes allocating processor resources.

3. The method of claim 2 wherein allocating includes allocating memory resources.

4. The method of claim 3 wherein defining batch-critical jobs includes:

calculating an urgency value for each batch job, wherein the urgency value is substantially equal to the execution time to complete the batch job divided by the time remaining to complete the batch job by the guaranteed completion time minus the maximum processors and memory allocated to the job;

defining a batch-job as batch critical when the calculated urgency value is equal to or greater than zero.

5. The method of claim 2 wherein defining batch-critical jobs includes:

calculating an urgency value for each batch job, wherein the urgency value is substantially equal to the execution time to complete the batch job divided by the time remaining to complete the batch job by the guaranteed completion time minus the maximum processors allocated to the job;

defining a batch job as batch critical when the calculated urgency value is equal to or greater than zero.

6. The method of claim 1 further comprising:

partitioning the resources of the multiprocessor system into at least one soft system partition, wherein the at least one soft system partition represents a user-level batch queue and is assigned resources and includes soft partition units representing available and unavailable resources over time intervals.

7. The method of claim 6 wherein allocating includes allocating resources based on the available resources over time intervals.

8. The method of claim 7 wherein certain of the multiple batch jobs are allocated multiple segments of the available resources over time intervals.

9. The method of claim 6 wherein partitioning includes partitioning the multiprocessor system into multiple soft system partitions.

10. The method of claim 6 wherein the at least one soft system partition includes at least one time-varying soft system partition, and wherein the time-varying soft system partition is allocated different numbers of processors based on defined time periods.

11. The method of claim 1 wherein the interactive jobs include normal time-share jobs and wherein scheduling includes scheduling batch-critical jobs ahead of the normal time-share jobs.

12. The method of claim 11 wherein the interactive jobs include real-time jobs and wherein scheduling includes scheduling batch-critical jobs behind the real-time jobs.

13. The method of claim 1 wherein the interactive jobs include normal time-share jobs and wherein scheduling includes scheduling batch jobs not defined as batch critical behind the normal time-share jobs.

14. The method of claim 13 herein the interactive jobs include weightless time-share jobs and wherein scheduling includes scheduling batch jobs not defined as batch critical ahead of the weightless time-share jobs.

15. A computer-readable medium comprising program code for executing the method of claim 1.

16. In a general purpose multiprocessor system, a method of scheduling batch jobs, comprising:
   defining a plurality of types of jobs, wherein the plurality of types of jobs includes batch jobs and interactive jobs, wherein the interactive jobs include a first interactive job;
   allocating resources to each batch job;
   calculating a guaranteed completion times for each batch job based on the resources allocated to each batch job;
   defining classes of batch jobs, wherein the classes of batch jobs include a critical batch job class and a non-critical batch job class, wherein batch jobs within the critical batch job class are assigned higher priority than batch jobs within the non-critical batch job class;
   determining if any of the batch jobs is a critical batch job; and
   if any of the batch jobs is a critical batch job, scheduling the batch jobs such that the critical batch job executes at a higher priority than does the first interactive job, and the first interactive job executes at a higher priority than do non-critical batch jobs, wherein the resources are dynamically distributed at intervals among the batch and interactive jobs as a function of execution priority.

17. The method of claim 16 wherein allocating includes assigning processor and memory resources.

18. The method of claim 16, wherein the first interactive job is a normal time-share job.

19. The method of claim 18, wherein the interactive jobs further include real-time jobs and weightless time-share jobs, wherein the real-time jobs are assigned a higher priority than the critical batch jobs and the non-critical batch jobs are assigned a higher priority than the weightless time-share jobs.

20. The method of claim 18, wherein the interactive jobs further include real-time jobs and wherein scheduling the batch jobs includes allocating the critical batch job to an idle processor ahead of the normal time-share job and behind the real-time jobs.

21. The method of claim 16 wherein determining if any of the batch jobs is a critical batch job includes calculating an urgency value (U) for each batch job, wherein the urgency value is a function of the execution time required to complete the batch job, the time remaining to complete the batch job by the guaranteed completion time, and the maximum number of processors allocated to the job.

22. The method of claim 16 wherein determining if any of the batch jobs is a critical batch job includes calculating an urgency value (U) for each batch job as a function of the execution time (E) required to complete the batch job, the time remaining (R) to complete the batch job by the guaranteed completion time, and the maximum number of processors (MaxCPU) allocated to the job, wherein the urgency value is substantially equal to the execution time to complete the batch job divided by the time remaining to complete the batch job by the guaranteed completion time minus the maximum processors and memory allocated to the job; and wherein a batch-job is batch critical when its urgency value U is greater than or equal to zero.

23. The method of claim 16, wherein scheduling the batch jobs includes assigning processors and memory to non-critical batch jobs as a function of affinity.

24. The method of claim 16, wherein allocating resources to each batch job includes partitioning the system into two or more soft partitions, wherein each soft partition represents one or more processors and an amount of memory, and wherein each batch job receives resources from only one soft partition.

25. The method of claim 24, wherein the number of processors and the amount of memory in a soft partition varies over time.

26. A computer-readable medium comprising program code for executing the method of claim 16.

27. A multiprocessor system, comprising:
   a plurality of processors;
   memory;
   a kernel;
   one or more kernel batch queues, wherein each kernel batch queue includes batch jobs scheduled for completion at some later time;
   one or more interactive queues, wherein each interactive queue includes interactive jobs;
   and a batch process server, wherein the batch process server assigns completion times to batch jobs stored in the kernel batch queues as a function of resources allocated to each batch job;
   wherein the kernel distinguishes between critical and non-critical batch jobs as a function of an urgency value (U) calculated for each batch job and wherein jobs in the kernel batch queues are ordered as a function of the urgency value calculated for each batch job; and
   wherein resources are dynamically distributed at intervals among the batch jobs as a function of the urgency value calculated for batch jobs at each interval.

28. The system according to claim 27, wherein the memory and the processors are distributed across two or more soft partitions and wherein each batch jobs is allocated resources within one of the soft partitions.

29. The system according to claim 27 wherein the urgency value is a function of the execution time (E) required to complete the batch job, the time remaining (R) to complete the batch job by the guaranteed completion time, and the maximum number of processors (MaxCPU) allocated to the job, wherein the urgency value is substantially equal to the execution time to complete the batch job divided by the time remaining to complete the batch job by the guaranteed completion time minus the maximum processors and memory allocated to the job;
   and wherein a batch-job is batch critical when its urgency value U is greater than or equal to zero.

30. A computer system, comprising:
   means for defining a plurality of types of jobs, wherein the plurality of types of jobs includes batch jobs and interactive jobs, wherein the interactive jobs include a first interactive job;
   means for allocating resources to each batch job;
   means for calculating a guaranteed completion times for each batch job based on the resources allocated to each batch job;
   means for defining classes of batch jobs, wherein the classes of batch jobs include a critical batch job class and a non-critical batch job class, wherein batch jobs within the critical batch job class are assigned higher priority than batch jobs within the non-critical batch job class;

means for determining if any of the batch jobs is a critical batch job; and means for scheduling the batch jobs such that a critical batch job executes at a higher priority than does the first interactive job, and the first interactive job executes at a higher priority than do non-critical batch jobs, wherein the resources are dynamically distributed at intervals among the batch and interactive jobs as a function of execution priority.

31. The system according to claim 30, wherein the means for allocating includes means for assigning processor and memory resources.

32. The system according to claim 30, wherein the interactive jobs further include real-time jobs and a normal time-share job and wherein the means for scheduling the batch jobs includes means for allocating the critical batch job to an idle processor ahead of the normal time-share job and behind the real-time jobs.

33. The system according to claim 30, wherein the means for determining if any of the batch jobs is a critical batch job includes means for calculating an urgency value (U) for each batch job, wherein the urgency value is a function of the execution time required to complete the batch job, the time remaining to complete the batch job by the guaranteed completion time, and the maximum number of processors allocated to the job.

* * * * *